Nov. 1, 1966 R. C. RAMSAY 3,282,249
APPARATUS FOR COATING FILAMENTARY METAL ARTICLE
Filed Aug. 6, 1957 2 Sheets-Sheet 1

INVENTOR

ROBERT C. RAMSAY

BY *Curtis Ailes Jr.*

ATTORNEY

Nov. 1, 1966   R. C. RAMSAY   3,282,249
APPARATUS FOR COATING FILAMENTARY METAL ARTICLE
Filed Aug. 6, 1957   2 Sheets-Sheet 2

INVENTOR

ROBERT C. RAMSAY

BY Curtis Ailes Jr.
ATTORNEY

United States Patent Office 3,282,249
Patented Nov. 1, 1966

3,282,249
APPARATUS FOR COATING FILAMENTARY METAL ARTICLE
Robert C. Ramsay, Reading, Pa., assignor to The Polymer Corporation, a corporation of Pennsylvania
Filed Aug. 6, 1957, Ser. No. 676,577
1 Claim. (Cl. 118—620)

This invention relates to an improved apparatus for forming a fused layer of material on the surface of a metallic article and more particularly to such an apparatus which is especially adapted to form such layers upon metallic articles which have a low heat-storage capacity.

It has heretofore been proposed to provide improved layers or coatings of various materials on the surfaces of articles such as metal articles by melting or fusing finely divided solid particles of coating materials on the surfaces of such articles. The best results with such methods are obtained generally by preheating the article to be coated, such as by means of convection or radiant ovens, to a temperature above the sintering or melting temperature of the pulverulent coating material prior to application of the coating material.

The oven preheating step has a number of serious disadvantages in the production of layers of coatings in that considerable heat losses from the ovens are involved, considerable preheating periods of time are required, and the preheating is likely to cause oxidation, degradation, or other deterioration such as that due to thermal shock, of the article. Also, in certain instances, the article which is to be coated is of very small or thin cross section, being fabricated of very thin sheet metal or comprising a thin sheet, strip or wire so that the article may have a very low heat-storage capacity. In such instances, it is often quite difficult to heat the article to a temperature sufficiently high so that the heat retained within the article during subsequent contact of the article with the pulverulent layer-forming material is sufficient to form a complete layer of the layer-forming material by sintering or fusion of particles upon the article.

Accordingly, it is one important object of the present invention to eliminate the necessity for preheating an article prior to contact with pulverulent material which is to be fused on the surface thereof.

It is another important object of this invention to provide a method whereby a complete layer or coating of good quality of fused layer-forming material may be provided upon an article having low heat-storage capacity by fusion of the layer-forming material thereon.

Other objects and advantages of this invention will be apparent from the following description and the accompanying drawings.

In carrying out the invention in one preferred form thereof, metal articles upon which a covering of a fusible coating material is to be applied, are axially moved into and removed out of the effective field of an induction heating coil, the field being located within a fluidized bed of the pulverulent coating material, the metal article becoming heated while positioned within the field and while immersed in the coating material, and moving into and out of the heating zone such that the coating material adheres to the article and flows out upon the surface to form a coating. Further heating may be effected after immersion by induction coil means or by conventional means such as radiant heating devices, or combinations thereof for further smoothing the coating film.

According to an important embodiment of the invention, continuous metal or metallic bodies having the form of rod, wire, cable, tube, or the like are coated by heating the bodies by a surrounding energized induction coil through which the body is led and moves in an axial direction while immersed in a fluidized bed of the coating material.

In carrying the invention into effect in applying a coating to the surface of a thin mild steel wire, the wire is continuously passed through a container in which a volume of pulverulent coating material is fluidized by an ascending flow of a gas such as air, while a tubular induction coil which is maintained cooled by coolant flow therethrough is energized by high frequency current, the wire being passed axially upwardly through the coil at a rate to effect heating at least to the fusion temperature of the particles. A further heating effect may be imparted either by an extension of the induction coil above the surface of the fluidized bed or by a separate coil spaced from the bed along the wire whereby to impart a smoothing of the adhered material. Alternatively or concomitantly postheating of the wire and coating may be effected by passing the uncooled wire through a zone wherein radiant heat is generated by a suitable means such as gas burners or electric heating elements.

The invention has application and utility to the coating of a wide range of thicknesses and cross sections of metal articles generally and of elongate reelable articles particularly, and is especially effective for the coating of bodies having cross sections which are too small in proportion to surface area to permit of uniform coating by preheating and subsequent immersion into a powdered mass of pulverulent coating material. In general the coating process is useful in applying protective coverings to individual metal articles which may be suspended from holders such as non-metallic tongs or clips or by suitable manipulating means such as a wire filament, for dipping into a fluidized bed axially of an energized heating coil, for the application of heat simultaneously with immersion in the bed.

A preferred embodiment of the invention is illustrated in the accompanying drawings wherein the equipment is shown schematically for carrying out coating processes involving simultaneous application of heat by induced alternating currents and immersion of articles to be coated in fluidized powder masses, as follows.

Figure 6:
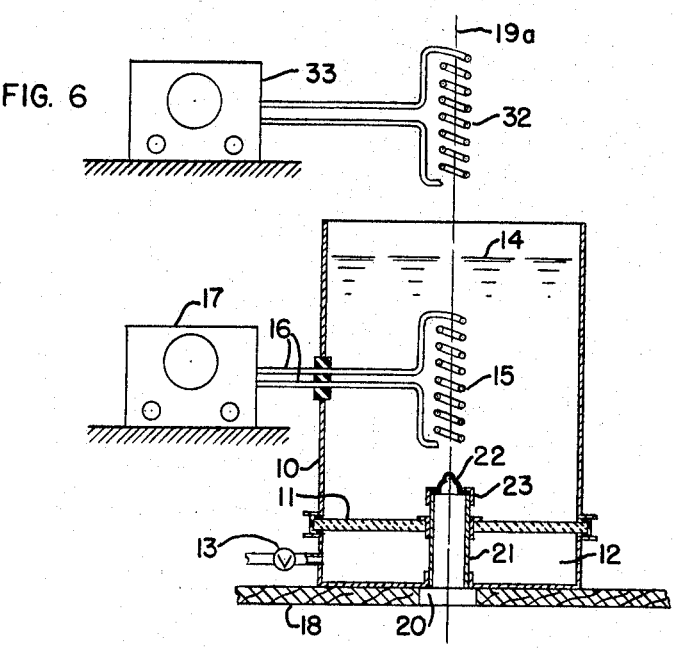

And FIG. 6 shows the combination of a single coil immersed in the bed surrounding the wire for heating it during immersion, and a second coil above the bed and spaced along the wire for postheating.

Figure 1:
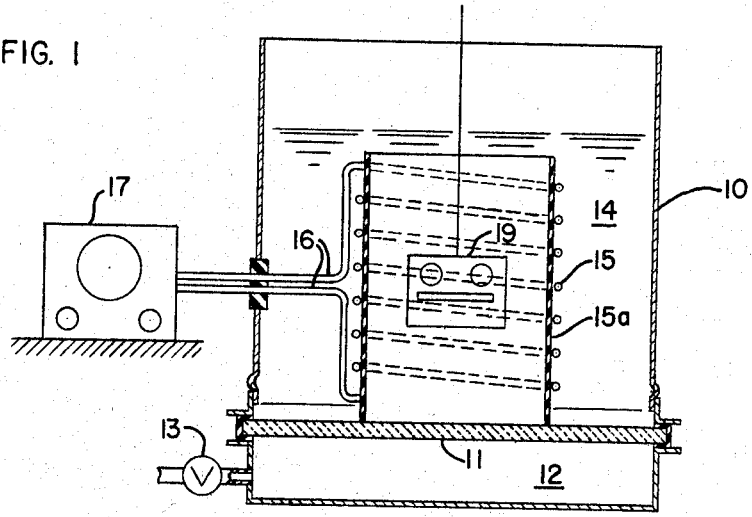
FIG. 1 shows apparatus for coating articles in a fluidized bed by dipping within the effective field of an induction coil within the bed.

Referring more particularly to FIG. 1 there is shown a form of apparatus for the purpose of coating a body which is a conductor of electricity by application of heat by induced currents while the body is immersed in contact with a fluidized mass 14 of pulverulent coating material. An article 19 is shown suspended from any suitable means by a filament to lie substantially in the field of a coil 15, energized by alternating current output of a high-frequency generator 17. The article is heated by the induced current to the point where the pulverulent coating material sinters and fuses thereon in order to form a coating. It will be appreciated, of course, that the article 19 must be inserted and removed in a precise time relationship, or the alternating current generator 17 must be equipped with a time switch device in order to expose the article 19 to the proper amount of current and heating effect.

The mass or bed of powder 14 is contained within an open-topped container 10. The powder is fluidized by an ascending current of gas, such as air, passing from chamber 12 in the lower part of the container through a transverse porous plate 11 forming a base upon which the powder mass is supported. A supply of air or any other suitable gas under pressure from a conventional supply source such as a blower or a compressor, or a pressure storage vessel (not shown), is led into the lower chamber 12 by way of a control valve 13 and an inlet pipe communicating with the chamber. Porous plate 11, which extends over at least a major part of the base area of the tank 10 supports the mass of pulverulent powdered material which is to be applied as a coating to the object. Within the coil 15 there may preferably be placed an electrically non-conductive tube of material 15a which may be preferably composed of a high-temperature electrically non-conductive material such as polytetrafluoroethylene for the purpose of preventing the article 19 from coming in contact with the individual turns of the coil 15 so that the turns cannot be shortened out by such contact. It is important, also, that the material 15a should not be electrically conductive so that the electromagnetic energy of the coil 15 will not be absorbed by the material 15a rather than by the object 19 which is to be coated.

It will be appreciated that the portion of the fluidized pulverulent coating material 14 within the container 10, which is not also within the container or barrier 15a, is not practically effective for the production of a coating. Accordingly, it is often preferable to make the barrier material 15a comprise the sides of the fluidized bed container. The winding 15 is then effectively outside of the container sidewalls. In such a modification, the barrier material 15a becomes the sidewall of the fluidized bed container.

In all of the embodiments of the invention, the porous plate 11 is preferably composed of an electrically non-conductive material such as a ceramic.

The apparatus shown in FIG. 1, with the exception of the coil 15, the barrier 15a, the generator 17, and the connecting leads 16, is substantially similar to a fluidized bed coating apparatus which is shown and described in British patent specification 759,214, published October 17, 1956.

As used in this specification the term "fluidized bed" is intended to have the conventional and recognized meaning to indicate a mass of solid particles which exhibit the liquid-like characteristics of mobility, hydrostatic pressure, and an observeruable free upper surface or boundary zone (interface) across which a marked change in the concentration of particles occurs. A fluidized bed differs from a dispersed suspension or a suspension of particles because in a suspension an upper level or interface is not formed. The suspension is usually observed to have a relatively low solids concentration, and may in general be regarded as analogous to a vapor; whereas a fluidized bed is analogous to a liquid.

The pulverulent layer-forming or coating materials employed in the present invention are preferably electrically non-conductive materials so that the electromagnetic induction energy is not absorbed by the layer-forming material but is reserved for the metal article which is to be coated or upon which the layer is to be formed. However, the range of materials which can be employed in the process of the present invention is practically as broad as the range of materials which can be applied by other fusion coating processes. In general it might be said that almost any layer-forming material can be employed which does not decompose very rapidly at or above its melting temperature and which will sinter or fuse or melt to form a complete layer or coating at a temperature below the deterioration temperature of the material from which the articles are made upon which the layer is to be formed. As used here, the deterioration temperature of the article means the temperature at which the article would melt or decompose or break or otherwise deteriorate.

Important examples of materials which can be applied by the present process are the organic polymeric thermoplastic resins such as polyethylene and the linear polyamides generally referred to as nylons. Nylons which are particularly useful are polyhexamethylene adipamide, polyhexamethylene sebacamide, and the polycaprolactams such as the polymer of spsilon caprolactam. Among other coating materials which are suitable for application by the present process are most of the thermoplastic resins or those having a termoplastic phase. Specific examples of these are polystyrenes, acrylic resins, epoxy resins, and various waxes. Porcelain, bitumen or asphalt, shellac, silicone resins, and glass are also examples of layer-forming materials which may be employed in the present invention. Mixtures of the above-mentioned materials and of other fusible materials may be employed, as well as mixtures of fusible and non-fusible filling or pigment materials.

Referring again specifically to FIG. 1, coil 15 preferably comprises at least several turns of a conductor whose ends are connected by leads 16 to the output of a suitable high-frequency current generator 17. The generator 17 may be of conventional construction and may be constituted, for example, as an induction alternator, a thermionic oscillator of high power, or a load-quenched spark oscillator, preferably being adjustable as to frequency over a range of radio frequencies. When a current flows in the coil, an alternating electromagnetic field of an intensity related to current value and coil form is developed about the coil, which in turn induces eddy currents within the conductive object—introduced within the helix. The intensity of the heating currents generated in the object is dependent upon the field strength and frequency, and the permeability and resistivity of the object, as well as its form factor. Radio frequencies are usually preferred. With such frequencies the currents tend to be localized in the skin or at the surface of the object, and do not in general penetrate appreciably, so that the greatest amount of heat is generated at or very near to the body surface. The particles of the fluidized bed are maintained in agitation by the upward flow of gaseous fluid, and when the object surface becomes heated to a temperature in excess of the melting or softening point of the particles, those which come into direct contact stick to the surface and tend to liquefy. Other particles are caught upon the surface, and coalesce to form a covering layer to which further particles cling. The amount of heat applied by the induction phenomenon may be regulated by controlling time, intensity, or both. The amount of coating material deposited upon the body may be regulated by controlling the amount of heat taken up by the body, and by the length of time it is immersed in the bed. By suitable adjustment of the several factors a wide range of coating rates and thicknesses may be achieved. Additional heat may be supplied by postheating in a convection oven or by incidence of infrared radiant energy from a suitable generator, where a thick clinging frosting of powder must be fully fused and smoothed.

In general, the rate of application of heat required to apply a protective coating to iron wire in diameters of less than about $\frac{1}{16}$ inch diameter will be of the order of from a few hundred watts to several kilowatts input to a suitable coil for wires moving at rates in the range of about 5 to 120 feet per minute, depending on the thickness of coating, nature of the coating composition, and permeability and resistivity of the conductor. In order to prevent the powdered coating material from adhering to the coil 15 or to the leads 16 due to electrical heating of these parts, they are preferably formed of tubing, for example, $\frac{3}{16}$ inch copper, in which a liquid or gaseous coolant is circulated. A preferred electrical coolant liquid is water.

Where the coil has a large number of turns, as is preferable in order to provide the strongest magnetic flux density along the axis of the helix, the latter may be supported by means of non-conducting rigid bars (not shown) suitably tied or clamped along the length of the coil, and in some instances these may be extended to rest upon the porous plate 11, or on any other portion of the structure.

Figure 2:
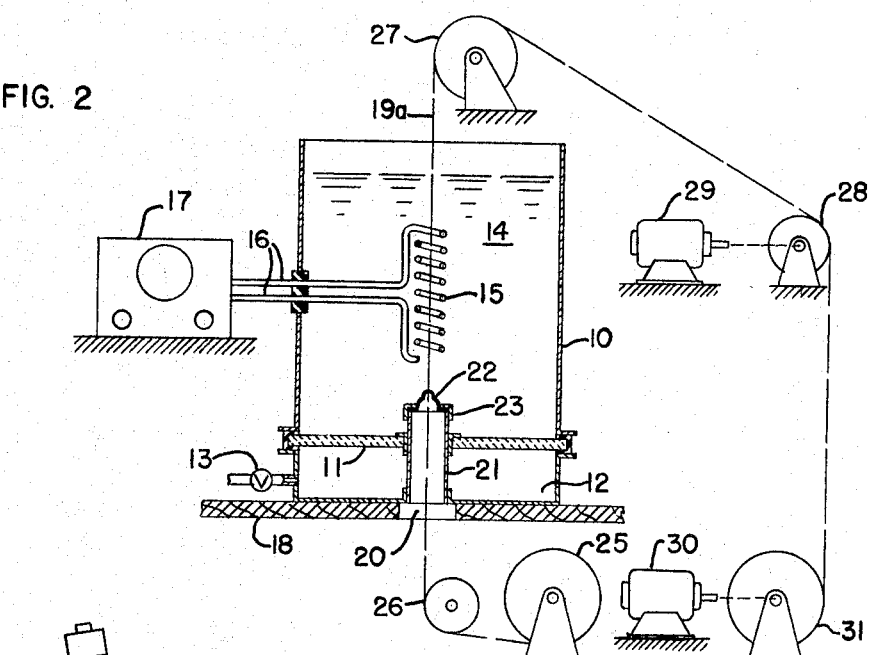
FIG. 2 shows an elevation view partly in section of a modified apparatus for coating a wire.

In FIG. 2 there is shown a modification of the apparatus of FIG. 1 which is specifically adapted for the continuous coating of an elongated metal article such as a metal wire. In this modification the container 10 rests upon a suitable platform indicated at 18, having an aperture 20, through which an elongate body 19a to be coated ascends in its course from a take-off reel 25 by way of a guide roller 26. A tube 21 which is secured at its lower end, as by welding, to the lower wall of chamber 12, passes upwardly through a registering aperture in porous plate 11 which lies vertically above the aperture 20, and is terminated in a threaded portion engaged by a flanged ring 23. A resilient sealing cap 22 in the form of a nipple of rubber or rubber-like material having flanges is retained upon the end of tube 21 by the ring 23. The elongate body 19a is led upwards through the tank and powder to pass over an upper sheave or guide roll 27 and thence is drawn by way of a capstan 28 which is powered by an adjustable drive motor 29. Body 19a then passes to a take-up reel 31 which is suitably powered, as by a small motor 30, to reel up the coated material. The speed of drive motor 29 is preferably adjustable by any suitable conventional variable speed drive system. The capstan 28 has one or more turns of the body 19a passed around it in order to provide an adequate frictional grip.

The mechanical coupling between drive motor 30 and the take-up reel 31 may include slipping clutch means of any well-known form for maintaining tension at a suitable value. If necessary, a brake is provided on take-off reel 25 to provide more tension. It will be observed in the embodiment shown in this FIG. 2 that the coil 15 comprises a large number of turns of relatively small helix diameter and that it is totally immersed in the fluidized mass of pulverulent coating material.

As in the previous embodiment, when a current flows in coil 15, the strength of which being adjusted by suitable controls associated with generator 17, the body 19a which is disposed in the relatively intense magnetic field within the coil, has eddy currents induced therein which heat the body. The particles of the fluidized bed are maintained in agitation and as the heating effect raises the temperature of the wire above the fusion temperature of the coating material, those particles coming in contact with the wire will soften and adhere thereto. As the wire rises upwardly, the heat therein flows radially outwardly through the adherent particles which melt to form a film upon which further particles coalesce to produce a resultant thicker film. When the body is withdrawn from the bed and from the coil, the latent heat in the wire and its coating tends to further liquefy the material to lower its viscosity and to allow surface tension effects to smooth out the deposit as a continuous, even layer.

Any conductive metal filamentary body, including tubular bodies or cables having metal sheaves, may be treated by the process according to the invention, suitable provision being made for each form of body to pass through a resilient seal in the apertured porous plate. Cap 22 may take any suitable form in accordance with the diameter and cross section of the body being coated. In the case of iron wires a more effective heat generating effect will in general be had than when dealing with a non-magnetic conductor body. The amount of heating effect and the rate of take-up by the capstan 28 are each separately adjustable, hence the settings for speed of body travel through the coil and the heating current therein may readily be found for any size of body, which will achieve the desired thickness of coating. These factors must be correlated, of course, to avoid overheating or underheating.

Figure 3:
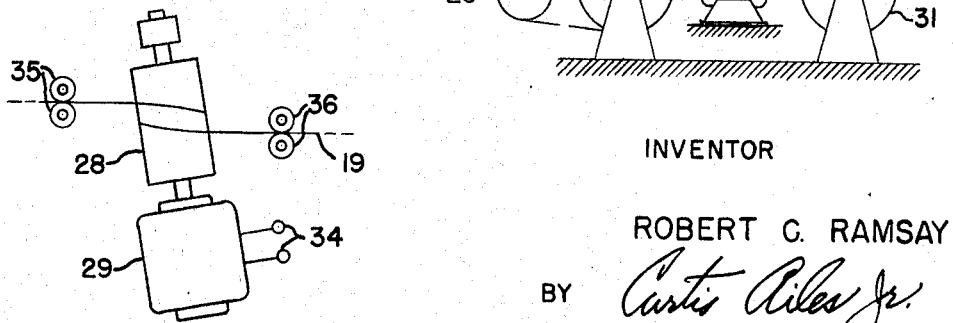
FIG. 3 illustrates a capstan drive for moving the wire, in the apparatus of FIG. 2.

The capstan device 28 and motor 29 are shown in a more detailed plan view in FIG. 3. The capstan device may comprise a rubber surfaced roll which may have grooves parallel with the cylinder axis. As shown, the roll may be set at an angle other than a right angle with the line of motion of filamentary body 19. As the body moves toward the roll it is guided between a pair of rolls 35, and on leaving the roll it passes between further guide rollers 36. Preferably, but not necessarily, the body 19 should contact the roll 28 over an arc of less than 360 degrees.

Motor 29 may be energized from a suitable power source connected through motor power terminals indicated at 34.

Figure 4:
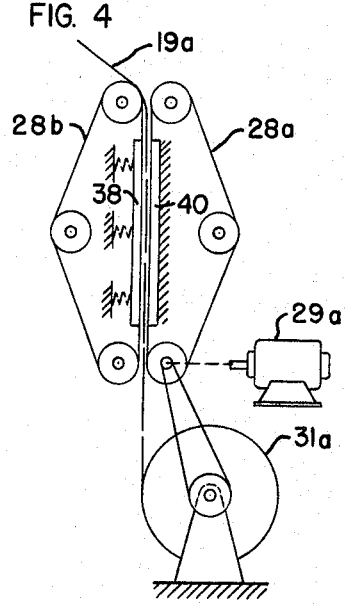
FIG. 4 illustrates a drive mechanism for moving strip when strip stock is to be coated by apparatus such as shown in FIG. 2.

Apparatus which is substantially identical to that shown in FIG. 2 may be used for the coating of flat metal strips on a continuous basis similar to that practised with the metal wire. With such materials, however, the capstan construction of FIG. 3 is preferably replaced by a belt-type of capstan and take-up drum construction such as is shown in FIG. 4. In FIG. 4 the capstan drive motor 29a is arranged to drive belts 28a and 28b, and also the take-up drum 31a. The belts 28a and 28b establish a firm frictional grip upon the elongated body 19a by reason of the extended contact between the belts and the body 19a and by reason of pressure plates 38 and 40 which force the belts against the body. In the modification of the apparatus of FIG. 2 for the coating of a strip article, it may be necessary, of course, to employ an enlarged tube 21 and a slotted opening in the sealing cap 22.

The desired amount of heating current applied to coil 15 may be determined by visual inspection of the body 19a as it leaves the bed 14. For each kind of coating substance or composition, particle size, diameter of wire, specific heat of the body, and desired thickness of coating, the amount of total heat input to the body while the body is within the bed and the rate at which it moves through the bed may be controlled to give the best results. As an upper limit it may generally be taken that too intense a heating effect has occurred whenever it is observed that the adherent particles or fused material has discolored, or smoke or bubbles issue from the coating. Excess heat is indicated also for certain coating materials such as the polyamides whenever globules of fused materials may be observed clinging to the filamentary body rather than wetting it as a uniform film. Because of the relatively wider temperature range over which some materials have considerable viscosity in the fused state, the formation of globules or beads which may run down may not occur until decomposition temperature has been exceeded. In an installation where postheating means such as infrared generators are used to aid in smoothing an initial deposit, only as much heating of the body 19a need be effected as will cause adherence of the necessary amount of coating material. Such a deposit may be observed to appear as a frosting of particles clinging to the slightly fused particles immediately in contact with the body surface, which persists until some distance above the bed 14, at which time the heat of the body and the heat applied by the postheating means liquefies the deposit to form a film.

Any suitable means for generating radiant heat as may be adapted from prior art techniques may be located along the course of the wire or other body 19a leaving the bed, as for example a bank of heating lamps, electric resistance elements and gas burners, located in a tunnel or surrounding cylindric housing (not shown) so as to apply heat to the external surface of the coating. The modification of the surface tension properties of the deposition of coating material by flow of heat radially inwards is conducive to the development of a uniformly thick coating, by permitting the external part of the applied coating to flow more readily than the inner part.

Figure 5:
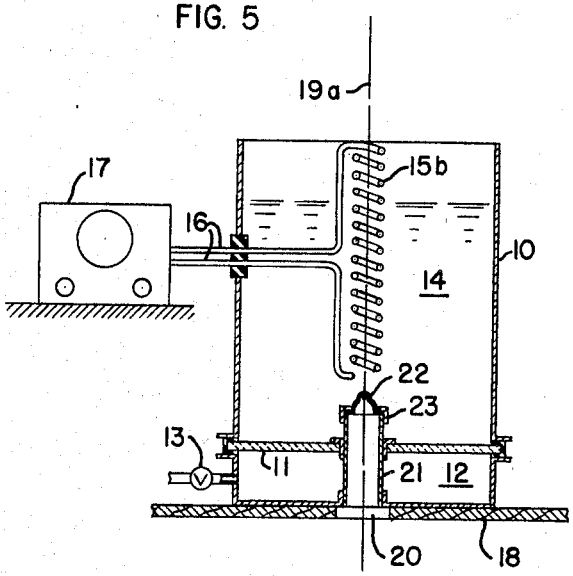
FIG. 5 shows a modification of the apparatus of FIG. 2 for continuing heating of the wire by extending the coil above the bed.

The postheating may also be accomplished inductively by a modification of the apparatus of FIG. 2 as indicated in FIG. 5. The apparatus employed corresponds substantially with that of FIG. 2 except that in this embodiment the coil 15 extends for a longer distance in the bed, and extends for some distance externally above the bed as indicated at 15b. The height of the bed is adjusted by choosing an amount of coating material for container 10 and a degree of fluidization so as to provide for the desired ratio of immersed portion to total length of the coil. By virtue of the arrangement described, the heating effect of the coil is continued after the wire is no longer in contact with the fluidized powder mass, to provide a postheating effect. This serves to make up the necessary quantity of heat to melt a thick adhering frosting of powder even when the body 19a is too small to store a sufficient heat content during heating within the fluid bed and in thicker wires and large diameter bodies provides a heating effect localized in the skin of the conductor to aid in smoothing out the deposit as a continuous film. In many instances postheating is of advantage in permitting higher speeds of operation.

Still another modification of the apparatus of FIG. 2 is shown by FIG. 6 in which a separate induction heating means in the form of an additional coil 32 is provided, having its own generator of high-frequency alternating current 33. The coil is disposed about the body 19 along the course after it leaves the bed 14, and is energized by the flow of a separately adjustable current. This separate adjustability of postheating energy is very important in many instances. The amount of heat energy applied to each of the coils 15 and 32 will in general be regulated at the discretion of the operator of the coating apparatus, and may best be determined by actual observation and the controls set in accordance with the effect produced on the work. The addition of further heat in the postheating of an elongate body is preferably effected when the mass of coating material applied per unit length is greater than can be melted with the heat that is stored in the wire when heated to just below the temperature where rapid decomposition or deterioration of the coating material occurs. Postheating is required when the nature of the coating material is such that the amount of coating material picked up by incipient melting upon the heated wire from the fluidized bed exceeds the amount that can be melted and liquefied by the heat stored in the elongate body to form a smooth coating.

The following examples are presented for the purpose of exemplifying the invention and are not intended to limit the scope thereof.

EXAMPLE 1

An apparatus substantially similar to that shown in FIG. 1 of the drawings, except for the absence of the insulating material 15a, was employed for the purpose of applying coatings of a powdered polyethylene material having a mesh size of less than 70 mesh to a cold rolled steel rod having a diameter of ½ inch and a length of 2½ inches. The alternating current generator employed in this example was a high-frequency induction heating generator designated model T–2½–1 operating at 450 kilocycles, made by the Lepel High-Frequency Laboratories, Inc. The coil 15 employed had 10 turns having an inside diameter of 1¼ inches and a length of about 5 inches. The coil was formed from copper tubing having an outside diameter of ¼ inch. The output voltage was 11 volts and the output amperage was 0.42 amp. The powdered polyethylene material was six inches deep when unfluidized, but was fluidized to a depth of about 9½ inches. With combined periods of immersion and energization of the generator, as indicated below, the results indicated in the following table were obtained:

| Immersion and Heating Time | Coating Thickness in thousandths of an inch | Coating Appearance |
|---|---|---|
| 10 seconds | 13.5 | Smooth, continuous, adherent. |
| 8 seconds | 12 | Excellent, smooth, adherent. |
| 6 seconds | 8 | Continuous, adherent coating having a slightly rippled surface. |

The following Table I relates to the coating of wire and is presented by way of illustration of the rate at which various sizes of copper wire may be raised to a surface temperature of 600° F. when passed axially through a fixed energized helical coil. At this temperature powdered thermoplastic coating materials such as polyamides and polyethylenes will adhere and flow out to produce thin films of fused coating.

In the operations illustrated by this Table I the dimensions of the coil found suitable for the purpose were a length of 10 inches comprising 60 turns, and an inside diameter of ⅜ of an inch comprising ⅛ inch radius copper tubing. Energy input to the oscillator tube loaded by the coil was just over two kilowatts, and the operating frequency was nominally 450 kilocycles. The material A was solid, bare, hard-drawn copper wire; material B was hard-drawn, bare, solid copper wire, #19 gauge; material C was a stranded wire made up of 7 copper strands of #21 AWG, equivalent to 12 gauge; and material D was a 14 strand copper wire of #30 gauge equivalent to 18 gauge.

Table I

[Heating rates for solid and stranded conductors axially placed within induction heating coil]

| Material | A | B | C | D |
|---|---|---|---|---|
| Speed, inches per sec | 2.8 | 5.5 | 8.5 | 11.1 |

It is apparent that the stranded wire, having a relatively larger inductive cross section for a given net area of effective conductor, has a higher heating rate since the coupling with the alternating field within the coil is improved.

The foregoing operations were carried out using the high-frequency induction heating generator mentioned above in Example 1.

A number of additional examples are set forth in the following description in illustration of the coating of steel wire and strip stock, employing the heating means described, where the load coil is partially immersed (as shown in FIG. 5) in a fluidized bed of a powdered coating material to be applied as a protective layer on the surface of the stock.

As coating material there was provided a pulverized thermoplastic polyamide, a polymerized epsilon caprolactam, having a particle size predominantly within the range from 70 mesh to 325 mesh. The powder was loaded into a fluidizing tank to an unfluidized depth of 11 inches and was fluidized to an expanded depth of 13 inches. The load coil used for energizing the wire had an outside helix diameter of 1¾ inches and an inside diameter of 1¼ inches and was made of ¼ inch O.D. copper tubing with 36 turns axially spaced ⅜ of an inch on centers.

EXAMPLE 2

A low-carbon steel wire having a bare diameter of 0.009 inch whose surface was thoroughly cleaned was threaded through the induction heating coil and was pulled over guide rollers adjusted to center the wire in the helix. The speed of movement of the wire was about 9 feet per minute with an input wattage to the oscillator of about 1320 watts. The resultant polyamide coating had a smooth, pearly appearance. The coating was observed to have completely coalesced within about 12 inches from the upper surface of the bed. The overall diameter of coating and wire was 0.032 inch. Under repeated flexing and bending the coating was observed to remain free of cracks.

EXAMPLE 3

A bright, low-carbon steel wire of 0.018 inch diameter was passed through the heating coil which was maintained as in Example 2 in a fluidized bed of the polyamide coating material. The wire was drawn through the coil coaxially thereof at the rate of nine feet per minute, and the input energy to the oscillator stage was about 1380 watts.

A smooth and uniform coating having an average thickness of 0.0115 inch was deposited on the wire, and after solidification, was found to adhere tightly. Repeated flexing of the wire failed to break the coating layer and the wire could be tied in knots without observable rupture.

EXAMPLE 4

A continuous coating operation was carried out as in Example 2 employing an 0.035 inch diameter round steel wire. The rate of travel was nine feet per minute, and the power input to the oscillator was regulated at about 1200 watts. The coating was observed to have a lightly frosted appearance just as it emerged from the bed, which gradually changed within the space of about 3 inches travel to a liquefied film of polyamide covering the wire. The film had substantially lost its tackiness and had become coalesced within about 17 inches of the bed surface. An average thickness of 0.007 inch of coating was produced, free from irregularities and unevenness.

EXAMPLE 5

A flat wire of low-carbon steel stock was threaded through the coil and a lower rate of heating was used for a rate of travel of nine feet per minute. Input to the oscillator stage was about 760 watts. The wire was clean and bright, measuring 0.099 inch wide by 0.017 inch thick, and after coating was measured at 0.116 inch by 0.037 inch. It was observed that the polyamide tended to deposit to a slightly greater thickness on the edges than on the flat side. This illustrates an important advantage of the present invention. In prior art methods for fusing a coating upon an article, as well as by other prior art coating methods, it is frequently difficult to obtain adequate coating coverage on corners and edges. However, in the present invention, since the heating effect of induced currents apparently is greater at corners and edges, there results a greater deposit of coating material at those portions of an article which is coated so as to provide greater edge coverage.

EXAMPLE 6

Flat strip low-carbon steel stock having a width of 0.501 inch and a thickness of 0.011 inch was passed through the coil in a vertical direction. At a speed of 10 feet per minute and with the oscillator plate current adjusted to show an input of 1500 watts, the coating deposited had a thickness of 0.010 inch on flat faces. The coating was continuous and adhered tightly. The surface of the coating was fairly smooth. The coating could not be loosened or pried off with the thumb nail, and repeated bending broke the strip before the coating failed. At a freshly sheared, end, it was possible to loosen the film by means of a knife blade, and such free end could be pulled free of the strip only with difficulty.

With the particular composition employed, the coating was transparent and had a pale straw hue. When other colors are desired, heat-stable dyes or mineral coloring pigments may be added.

The methods described hereinbefore are applicable to the covering of metal parts of composite objects in which other parts may be composed of other materials. For example, articles combining metal and one or more organic substances such as wood may be immersed for effecting a coating of the metal alone without harm to the wood and without coating the wood. The method has particular application where the organic substances may be readily deformed or destroyed by heating to the metal coating temperature by other methods. But by the rapid application of heat to the surface of the metal portions by induced currents, the surface fuses the coating material coming into contact therewith without the necessity of storing heat in the whole of the metal body. As a consequence, faster cooling also results.

The following claim is intended to define the valid scope of this invention over the prior art and to cover all changes and modifications falling within the true spirit and valid scope of the invention.

I claim:

Apparatus for coating a filamentary metal body comprising a tank having a bottom and side walls and an open top, a horizontally disposed porous plate dividing the tank into a lower chamber and an upper chamber container portion adapted to receive a filling of powdered coating material, means for passing a gas under pressure into said lower chamber and through said porous plate to fluidize said coating material, an aperture in said plate in vertical registering relation with an apreture in the bottom of the tank, a cylindric sleeve extending vertically between and through the said apertures into the powder filling and having a resilient pierced closure fitted therein whereby to permit the filamentary body to be passed upwards into the tank through the closure, and an induction heating coil positioned in the tank in axial alignment with said sleeve adapted to have the filamentary body passed axially therethrough while in contact with said coating material.

References Cited by the Examiner

UNITED STATES PATENTS

| | | | |
|---|---|---|---|
| 1,726,431 | 8/1929 | Fourment | 117—22 |
| 2,110,893 | 3/1958 | Sendzimir | 117—51 |
| 2,203,606 | 6/1940 | Whitfield et al. | 117—51 X |
| 2,320,801 | 6/1943 | Simon | 117—103 X |
| 2,363,741 | 11/1944 | Montgomery. | |
| 2,395,157 | 2/1946 | Work et al. | 117—33 |
| 2,671,739 | 3/1954 | Lander. | |
| 2,719,093 | 9/1955 | Voris | 117—21 X |
| 2,785,082 | 3/1957 | Clough et al. | 117—107 |
| 2,844,489 | 7/1958 | Gemmer | 117—20 |

FOREIGN PATENTS 1,100,263   3/1955   France.

OTHER REFERENCES

Journal of the Electroche. Soc., October 1951, pages 385 to 387.

WILLIAM D. MARTIN, *Primary Examiner.*

RICHARD D. NEVIUS, *Examiner.*

T. G. DAVIS, S. H. COHEN, *Assistant Examiners.*